PROTECTIVE CIRCUIT
Filed June 14, 1954
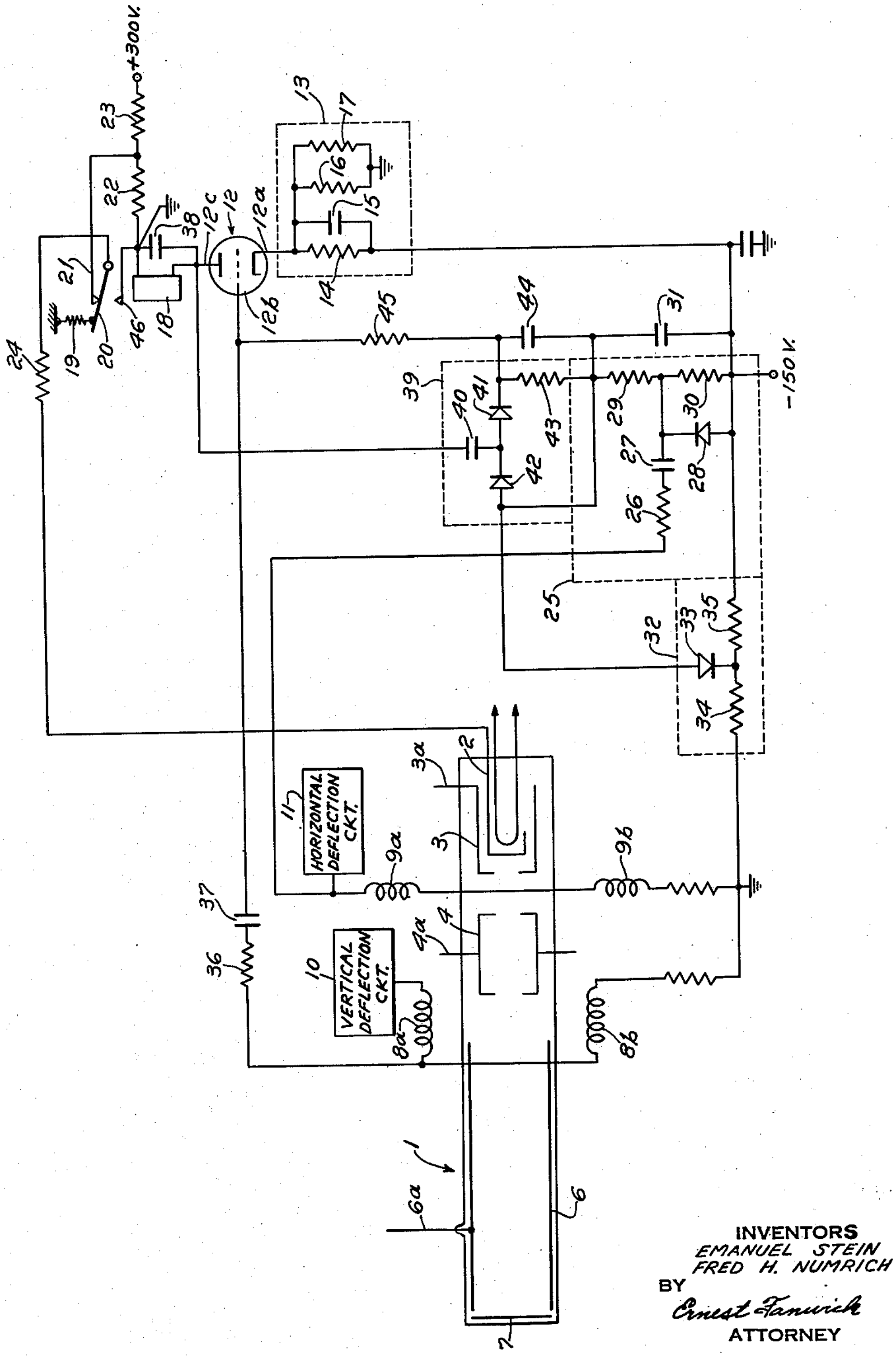
INVENTORS
EMANUEL STEIN
FRED H. NUMRICH
BY
Ernest Fanwick
ATTORNEY United States Patent Office 2,810,858

Patented Oct. 22, 1957

2,810,858

PROTECTIVE CIRCUIT

Emanuel Stein, Fairlawn, and Fred H. Numrich, Clifton, N. J., assignors to International Telephone and Telegraph Corporation, Nutley, N. J., a corporation of Maryland Application June 14, 1954, Serial No. 436,626

3 Claims. (Cl. 315—20)

This invention relates to protective circuits and more particularly to circuits for protecting electronic tubes such as cathode ray tubes against destructive electron beam current.

In the television art there is frequently made use of cathode ray tubes in television cameras for transmitting images, as well as in television receivers for reproducing the transmitted image. When cathode ray tubes are utilized in television systems either as pickup tubes in the camera or display tubes in the receiver, it is customary to provide ray deflecting devices which cause the ray or beam to periodically traverse the target area which comprises, for example, the photo-electric mosaic screen or the photoconductive surface of the camera tube or the fluorescent screen of the reciver tube. If, by reason of failure of the ray deflecting devices, the ray or beam should come to rest upon the target area and remain stationary for even a very short time the tube is rendered substantially useless for television purposes. Even further, if due to the failure of only one of the deflecting means, the beam should continuously scan only a single line, the tube is rendered substantially useless. In order to prevent damage to the target area and thus the rendering useless of the tube, it is necessary to provide means which prevent the beam from remaining either stationary or tracing the same line. This is particularly so when expensive cathode ray camera tubes are used for transmitting pictures in which the photo-electric mosaic screen or the photoconductive surface is liable to be damaged in the event of failure of the scanning apparatus.

In the past a number of protective systems and circuits have been developed which, when operating properly, will prevent the damaging of a cathode ray tube due to a stationary beam. For example, in one of the protective systems known to the prior art, means are provided which deprive the first anode in the cathode ray tube of a positive potential when the scanning beam ceases to be deflected in accordance with a predetermined pattern. In another device known to the prior art, separate control potentials are derived from the deflecting signals and each is applied to a separate control electrode of a relay actuating tube controlling the application of beam cut-off bias to the cathode ray tube to normally maintain said cathode ray tube operative and when the control potentials fall below a predetermined level, the beam is cut off.

Most protective circuits known to the prior art, as described above, do not provide the maximum amount of protection which a cathode ray tube requires since in such protective circuits no means are available to prevent the damage to the tube in the event of breakdown of the protective circuits themselves. Obviously if any reliance is to be placed in a monitor, the monitor must be more reliable than the protected device. It is, of course, preferable to include within the protective circuit a "fail-safe" feature such that, in the absence of either one of the deflecting voltages, or if either of the deflecting voltages should fall below a predetermined level, or if the system negative bias supply voltage should fail, or if any of the components comprising the protective circuit itself should fail, the cathode ray tube is protected against damage by a stationary beam. Such a "fail-safe" feature insures the cathode ray tube against damage in any event.

Therefore, it is an object of our invention to provide "fail-safe" means whereby a cathode ray tube is protected against the failure of the beam deflection means.

Another object of our invention is to provide beam current cut-off bias to a cathode ray tube in the event of failure of either the deflecting means or the negative bias supply voltage or some of the components of the protective circuit.

A further object of our invention is to provide a protective circuit for a cathode ray tube which will prevent destruction by stationary cathode ray beam in the event of failure of the components within the protective circuit itself or within the cathode ray deflection generators.

In accordance with one feature of our invention, the protection circuit comprises a single triode having a relay coil in its plate circuit and means coupled to its control grid circuit for developing a positive potential responsive to both the applied deflection voltages. The relay, in its normally deenergized position, is arranged to apply beam current cut-off bias to the cathode ray tube; but when plate current flows through the triode the relay is energized removing the beam current cut-off bias and permitting normal operation of the cathode ray tube. The steady state plate current in the triode is controlled by the total positive direct potential developed across two series capacitors in the grid circuit, each capacitor being charged positively by the horizontal and vertical component of the scanning voltages respectively through separate crystal rectifiers.

Another feature of the protective circuit of this invention is the use of regenerative feedback to achieve stable operation in order to make the operation of the protective circuit relatively independent of amplitude variations in the applied deflection voltages. Effectively the triode functions both as a direct current control device for operating the relay, and as a regenerative alternating current amplifier for one of the components of the scanning voltage.

The above-mentioned and other features and objects of this invention will become more apparent by reference to the following description taken in conjunction with the accompanying drawing, in which:

The figure of the drawing is a schematic diagram, partly in block form, of a protection circuit for a cathode ray camera tube in accordance with one embodiment of our invention.

Referring to the drawing, one embodiment of our invention is shown applied to a television camera comprising a cathode ray pickup tube 1 and asociated circuits. The cathode ray pickup tube may be of the conventional design including an indirectly heated cathode 2, a control grid 3, a first anode 4, a focusing grid 6 and a photoconductive surface 7, the beam being focused both electrostatically and magnetically. Suitable operating voltages are applied to the leads *3a*, *4a* and *6a* of the control grid 3, first anode 4 and focusing grid 6 respectively. In general, the cathode 2, control grid 3 and first anode 4 may be termed the cathode ray beam gun while the photoconductive surface 7, may be termed the target area. Of course, it will be readily understood that the focusing grid 6 is supplied via connection *6a* with a positive voltage from a suitable source, while the first anode 4 is supplied via connection *4a* with a suitable positive voltage from another source. The cathode ray or beam is caused to traverse the target areas 7 in two directions, each perpendicular to the other by the utilization of electromagnetic deflection coils. The vertical deflection coils 8a and 8b cause the beam to move in a vertical direction while the horizontal deflection coils 9a and 9b cause the cathode ray beam to traverse the target area 7 in a horizontal direction. Fluctuating potentials are generated in the vertical deflection circuit 10 and the horizontal deflection circuit 11 to provide sources of voltage for the deflecting coils 8a, 8b and 9a, 9b causing the beam to traverse the target area according to a predetermined pattern. If during the operation of the camera tube either of the deflection circuits or their interconnections should fail, the photoconductive target area 7 of cathode ray tube 1 would immediately be ruined. Even though one of the circuits should fail or the connections between it and the deflecting coils should break, the target might be ruined since the beam traversing the target in a single direction causes much higher localized energy dissipation than normal. The cathode ray camera tube heretofore described is well-known to those skilled in the television art and no further explanation is believed necessary. It will of course be apparent that the protective circuit of our invention can readily be utilized in conjunction with other types of cathode ray camera tubes now in widespread use in the television art.

In the absence of any scanning current coupled from the deflection circuits 10 and 11 to the deflection coils 8a, 8b and 9a, 9b, an electron discharge device 12 is biased beyond current cut-off by a voltage divider 13 coupled to its cathode 12a and consisting of resistance 14, by-pass condenser 15 and resistances 16 and 17. Since electron tube 12 is biased not to conduct, no current flows through the winding of relay coil 18 in the plate or anode circuit of the electron discharge device 12. Since no current flows through relay coil 18, spring 19 forces the armature 20 to remain in contact with fixed contact 21 and a beam cut-off biasing voltage is applied to the cathode 2 of the camera tube 1 through the voltage divider network comprising resistances 22 and 23, through the relay contact 21 and through resistor 24.

When fluctuating voltages are generated in circuits 10 and 11 to provide deflecting current outputs to the deflection coils 8a, 8b and 9a, 9b, the horizontal scanning component coupled to coils 9a and 9b is rectified by the crystal diode rectifier circuit 25 comprising resistance 26, capacitor 27, crystal diode 28, resistances 29 and 30 and capacitor 31. Due to the rectification of the horizontal scanning component in the crystal diode rectifier circuit 25 a positive direct voltage is developed across capacitor 31 which is in the control grid circuit of electron discharge device 12. The magnitude of the direct voltage developed across capacitor 31 is determined by a crystal diode limiting circuit 32 comprising a crystal diode 33 and a voltage divider network of resistances 34 and 35. The voltage divider network comprising resistances 34 and 35 determines the level at which the crystal diode 33 of the crystal diode limiting circuit 32 will begin limiting the direct potential developed across the condenser 31. The magnitude of the positive direct potential applied to the control grid of electron discharge device 12 due to the rectification of the horizontal scanning voltage is adjusted so as to bias the vacuum tube 12 at the threshold of plate current conduction. Thus, it will be seen that the positive direct potential developed across capacitor 31 by the horizontal scanning component serves as a grid bias "base" upon which the vertical scanning component control voltage can add its positive potential and thus cause heavy conduction in the vacuum tube as hereinafter explained.

The vertical scanning component output of deflection circuit 10, which is usually a fluctuating voltage or "sawtooth" waveform, is applied directly to the control grid 12b of electron discharge device 12 through resistance 36 and capacitor 37. This alternating voltage is amplified across the impedance of relay coil 18 in parallel with the filtering capacitor 38 in the plate circuit of electron discharge device 12. This amplified voltage output of tube 12 is applied to a peak-to-peak diode rectifier circuit 39 comprising capacitor 40, diode 41, diode 42, resistance 43 and capacitor 44. The positive direct voltage output of the peak-to-peak rectifier circuit 39 is applied across capacitor 44 which is in the control grid circuit of the discharge device 12 being in series with capacitor 31 and resistance 45. This positive control voltage, developed across capacitor 44 and applied through resistance 45 to the control grid, causes more plate current to flow in the electron tube 12 at the same time increasing its transconductance characteristic and causing greater gain. This greater gain, in turn, causes an increase in the rectified positive direct voltage applied to control grid 12b. This regenerative build up of direct current control voltage applied to the control grid continues until a stable condition is achieved, this point being determined by circuit parameters and vacuum tube characteristics as will be readily understood by those persons skilled in the art. At this point plate current safely exceeds the value required to energize relay coil 18, moving armature 20 to the lower contact 46. When the relay is energized and armature 20 connects with fixed contact 46, the cathode 2 of the camera tube 1 is connected to ground through resistor 24, thus permitting normal operation of the camera tube.

If either component of the scanning current is eliminated, the vacuum tube 12 is returned to its threshold of conduction and the relay coil 18 is deenergized applying the beam current cut-off potential to the cathode. If any portion of the protective circuit fails, it is obvious that the relay will also be deenergized applying the beam current cut-off potential to the cathode and resulting in the "fail-safe" operation of the protective circuit of our invention.

In order to prevent individual vacuum tube characteristics from affecting the circuit operation excessively, sufficient direct current cathode degeneration is provided by resistor 14 to stabilize the tube characteristics.

While we have described above the principles of our invention in connection with specific apparatus, it is to be clearly understood that this description is made only by way of example and not as a limitation to the scope of our invention as set forth in the objects thereof and in the accompanying claims.

We claim:

1. In combination, a cathode ray tube having a target area, means, including a cathode, within said tube for developing a cathode ray beam and directing it toward said target, means including a first source of fluctuating potential for causing said beam to be deflected in a first direction, means including a second source of fluctuating potential for causing said beam to be deflected in a second direction perpendicular to said first direction, an electron discharge device having at least a cathode, grid and anode circuit, said anode circuit including a relay winding, an armature and a first and second fixed contact associated with said winding, said armature making a connection with said first contact in the absence of energization of said winding, means to bias said electron discharge device beyond cut-off in the absence of a control voltage applied to said grid, a source of cathode ray beam cut-off bias coupled to said first contact, means to connect said armature to the cathode of said cathode ray tube, means to rectify a portion of said first fluctuating potential to develop a first unidirectional control voltage, means to limit the magnitude of said first unidirectional control voltage, means to apply said limited first control voltage to bias the grid of said electron discharge device, the magnitude of said limiting being such as to bias said device, when the first control voltage is applied to the grid, at the threshold of conduction, means to apply a portion of said second fluctuating potential to the grid of said device, means to take from the anode circuit of said device an amplified second fluctuating anode potential, means to couple said amplified fluctuating anode potential to a rectifier circuit to develop a second unidirectional control voltage, means to apply said second unidirectional control voltage to bias said grid to cause said device to conduct provided said first control voltage also biases said grid whereby said relay winding causes said armature to make contact with said second fixed contact when said device conducts causing the beam current cut-off bias to be disconnected from said cathode ray tube.

2. In combination, a cathode ray tube having a target area, means, including a cathode, within said tube for developing a cathode ray beam and directing it toward said target, means including a first source of fluctuating potential for causing said beam to be deflected in a first direction, means including a second source of fluctuating potential for causing said beam to be deflected in a second direction perpendicular to said first direction, an electron discharge device having at least a cathode, grid and anode circuit, said anode circuit including a switching circuit arrangement responsive to the non-conduction of said electron discharge device to protect said cathode ray tube due to malfunction of said sources of fluctuating potential, means to bias said electron discharge device beyond cut-off in the absence of a control voltage applied to said grid, means to rectify a portion of said first fluctuating potential to develop a first unidirectional control voltage, means to apply said first control voltage to the grid of said device to bias said device to the threshold of conduction, means to apply a portion of said second fluctuating potential to the grid of said device, means to couple from the anode circuit of said device an amplified second fluctuating potential, means to couple said amplified fluctuating potential to a rectifier circuit to develop a second unidirectional control voltage, means to apply said second unidirectional control voltage to bias said grid to cause said device to conduct provided said first control voltage also biases said grid, said switching arrangement being responsive to the conduction of said device to enable normal operation of said cathode ray tube.

3. A protection circuit for a cathode ray beam tube having means including a first source of fluctuating potential for causing the cathode ray beam of said tube to be deflected in a first direction and means including a second source of fluctuating potential for causing the cathode ray beam of said tube to be deflected in a second direction perpendicular to said first direction comprising a switching circuit coupled to said tube to render said tube operative in the presence of both said fluctuating potentials and inoperative in the absence of either or both of said fluctuating potentials and a control circuit coupled to said switching circuit including an electron discharge device having at least a cathode, an anode and a control grid whose conduction condition controls said switching circuit, means to bias said device beyond cut-off in the absence of a control voltage applied to said grid, means to rectify a portion of said first fluctuating potential to develop a first unidirectional control voltage, means to couple said first control voltage to said control grid to bias said device to the threshold of conduction, means to apply a portion of said second fluctuating potential to said control grid, means coupled to said anode to rectify the amplified second fluctuating potential to develop a second unidirectional control voltage and means to apply said second unidirectional control voltage to said control grid to produce conduction in said device provided said first device also biases said grid to render said tube operative.

References Cited in the file of this patent

UNITED STATES PATENTS

| | | |
|---|---|---|
| 2,098,384 | Goodrich | Nov. 9, 1937 |
| 2,131,203 | Von Ardenne | Sept. 27, 1938 |
| 2,222,426 | White et al. | Nov. 19, 1940 |
| 2,261,645 | Deludux | Nov. 4, 1941 |
| 2,476,167 | Wendt | July 12, 1949 |
| 2,635,208 | Cage | Apr. 14, 1953 |
| 2,709,768 | King | May 31, 1955 |